United States Patent Office 3,006,950
Patented Oct. 31, 1961

3,006,950
PROCESS OF MAKING METHYL
METHACRYLATE
Francis Weiss and Jacques Modiano, Pierre-Benite, and Jacques Marion, Lyon, France, assignors to Societe d'Electro-Chimie, d'Electrometallurgie et des Acieries Electriques d'Ugine, Paris, France, a corporation of France
No Drawing. Filed July 20, 1960, Ser. No. 43,993
Claims priority, application France July 31, 1959
2 Claims. (Cl. 260—486)

This invention relates to a process of making methyl methacrylate from acetone cyanhydrine.

An object of the invention is to provide a process of making simultaneously methyl methacrylate and methacrylic acid from acetone cyanhydrine.

In the processes presently used for the production of methyl methacrylate from acetone cyanhydrine, the acetone cyanhydrine is reacted, in a first stage, with strong sulphuric acid or oleum, so as to obtain a reaction mixture in which the most part of the acetone cyanhydrine is in the state of methacrylamide. This mixture will be designated subsequently by the words "methacrylamide sulphuric solution."

In a second stage, is is esterified with methanol.

Said processes are all founded on the use of a great excess of methanol which operates, on the one hand, to shorten the reaction duration, and, on the other hand, to obtain methyl methacrylate as the sole valuable reaction product with a very small quantity of methacrylic acid.

Now, the use of a great excess of methanol, attaining two or three times the theoretical quantity and even more, presents two material drawbacks:

The methanol loss in the form of methyl oxide due to the alcohol dehydration in the suplhuric mixture is high and increases with the quantity of methanol used.

The reaction product contains always a high ratio of free excess methanol.

Obtaining pure methyl methacrylate is not practically realizable by distillation of the ester-alcohol mixture to which the known processes lead, the methanol thus separated carrying away, in the form of an azeotrope, a too considerable fraction of the produced methyl methacrylate.

It is necessary, therefore, to separate the excess methanol from the ester before rectification of the ester. That implies installations for removing methanol with water or brine, and recovery of the methanol by distillation of the obtained washing waters.

On the other hand, these expensive operations effect always a considerable methanol loss increasing heavily the cost.

But over and above the difficulties inherent to the very principle of the processes presently carried out for the production of methyl methacrylate, said processes present other economic and technical drawbacks.

In a first type of process, the esterification is effectively made by heating the methacrylamide sulphuric solution with a methanol excess, if desired in the presence of water, at the boiling point of the mixture, then by distilling the reaction product to separate the volatile elements, among which are methyl methacrylate and uncombined methanol, from the sulphuric acid and ammonium sulphate formed during the reaction.

The distillate is generally washed with water or a saline solution to remove the soluble products—the most important being methanol—before the final rectification of the ester.

In an alternative method, the reaction product obtained after esterification might be flowed in water or saline solution, so as to separate the ester in the state of a decanted liquid layer which will be subsequently purified by fractional distillation.

In spite of the high methanol excess used which, as mentioned above, attains two or three times or more than the theoretical quantity, on the one hand, the ester molar yield with respect to the acetone cyanhydrine is not very high and does not exceed 75 to 80% of the theoretical yield, and on the other hand, the duration of the esterification reaction is long (about twenty hours), and therefore not very economical owing to the relatively low temperature at which the operation is effected, and that is connected with the low boiling point of the reaction mixture.

Moreover, this known method may not be practically operated continuously.

In a second type of process using the same principle as the earlier one and of which it is an improvement, the methacrylamide sulphuric solution is treated countercurrent with methanol vapors or methanol and water vapors, which makes possible the continuous execution of the process.

The formed ester distills as it is formed, mixed with water and methanol. The amide transformation ratio into ester is improved and the reaction duration shortened. But the high temperature—about 150° C.—necessarily maintained at the bottom of the esterification apparatus to carry away the organic products contained in the sulphuric acid and ammonium sulphate residual solution, causes a material loss of methanol in the form of methyl oxide owing to the increase of the sulphuric acid concentration, together with a sulphurous gas emission due to the attack of the organic products by the latter. The presence of methyl oxide and sulphurous gas highly increases the polymerization risks in the devices.

Besides, the phenomenon of corrosion by sulphuric acid is important at the high temperatures used. At last, as in the case of the first-mentioned type of process, the ester can be purified only after separating the excess methanol by washing with brine or water.

Contrary to the presently known processes, the applicants have devised an economical process of making methyl methacrylate proceeding exclusively in liquid phase and eliminating difficulties connected with the use of a high methanol excess and the recycling of the latter.

The present invention relates, therefore, to a process of making methyl methacrylate in the liquid phase by esterification of a methacrylamide sulphuric solution obtained from acetone cyanhydrine and sulphuric acid, which comprises employing determined and limited quantities of water and methanol, as mentioned hereafter, so as to produce methacrylic acid with methyl methacrylate, then decanting the organic phase and separating directly, by fractional distillation, the pure methyl methacrylate contained in it, from the attending methacrylic acid, which may be recycled or extracted in variable quantities for commercialization.

Contrary to what could be expected from the prior publications, the reaction between the methacrylamide sulphuric solution, the water and a limited quantity of methanol, enables to attain very high amide transformation ratios into valuable methacrylic products: methyl methacrylate and methacrylic acid.

It was surprising that, in spite of the strong solubility of methanol in sulphuric acid, only a very small proportion of the methanol used was in the sulphuric phase at the end of the reaction.

The applicants noted, besides, that the absence of a notable excess of methanol, which acts as a dissolving intermediary in the prior processes, enables one to collect the totality of the formed methyl methacrylate and methacrylic acid, accompanied by a very small quantity of unreacted methanol, by mere decantation of the reaction mixture.

The process according to the invention may be carried out as follows: A methacrylamide sulphuric solution with water and a limited quantity of methanol is heated under stirring, for a duration depending on reagent ratios and chosen reaction temperature. At the end of the reaction the light phase containing almost the totality of the organic products: methyl methacrylate, methacrylic acid and a very small quantity of unreacted methanol, is separated, by decantation, from the aqueous heavy phase containing the whole of the sulphuric acid and ammonium sulphate. The aqueous phase may be used as it is, for instance, for the production of ammonium sulphate, due to the small quantity of the contained organic substances.

The organic phase may be neutralized and methacrylic acid is thereby transformed into salt which it is possible to recycle or extract. The ester layer is decanted, then rectified. But applicants prefer to separate, by fractional distillation, the organic phase in its pure components: methyl methacrylate and methacrylic acid, without any pre-treatment.

In this case, the methacrylic acid, thus easily separated from methyl methacrylate, may be, wholly or partly, recycled to the esterification step or removed totally or partly to be used commercially.

The preferred operating conditions are as follows:

REAGENTS RATIOS

Methanol is preferably used in quantities approaching the stoichiometric quantity, at the rate of 0.7 to 1.5 moles per mole of acetone cyanhydrine for instance; but it is within the scope of the invention to employ quantities of methanol larger or smaller than the above-mentioned quantities.

In the first case, the excess of methanol acts as a dissolving intermediary. It decreases the efficacy of the aqueous and organic phase separation. Methanol is dissolved in the aqueous phase together with methyl methacrylate, but the free methanol ratio in the organic phase still remains very slight, about 3 to 4% for instance for an excess of methanol attaining three times the theoretical quantity.

It is important here to note that such an excess of methanol, regularly used in the known processes, is in the known processes collected particularly in the organic phase, contrary to the process according to the invention in which it is collected in the aqueous phase. This shows the considerable difference between the present process and the other current processes which require the previous elimination of the methanol from the organic phase, and consequently a distillation either during or after esterification, and this before undertaking the separation of the methacrylic ester.

Therefore, in spite of the large excess of methanol, the process according to the invention remains valid. It is, however, rendered less advantageous since, anyway, the excess methanol will have to be recovered in a treatment of the aqueous phase, should it be only on economical grounds.

In case quantities of methanol smaller than indicated (0.7 to 1.5 mole) are used, a greater amount of methacrylic acid forms without lowering the decantation yield of the methacrylic products.

Finally, the method enables one to vary the respective ratios of the produced methacrylic acid and methyl methacrylate within wide limits.

Water is used at the rate of 1 to 6 moles, preferably 2.5 to 4 moles, per mole of acetone cyanhydrine.

The favorable influence of an increase in the amount of water upon the esterification speed is well known. It enables, besides, to limit easily the dehydration of methanol into methyl oxide, which increases both with the reaction temperature and sulphuric acid concentration, said concentration being lowered by water addition.

TEMPERATURE

The maximum reaction temperature is the boiling point of the mixture. Under atmospheric pressure, it is relatively low, about 90° C. Although it is possible to operate under those conditions, the prolonged reaction time would render the operation not very economical.

A complementary characteristic of the invention is to place the reactor under a pressure sufficient to attain temperatures between 90 and 150° C., preferably between 110 and 130° C., so as to increase the methacrylamide esterification speed. It is possible to fulfill these conditions in every known way and operate, for instance, under an autogenous pressure or inert gas pressure. In general, it is sufficient to place the reactor under an absolute pressure of about 2 to 4 atmospheres in order to obtain the maximum advantages of the process.

REACTION TIME

The necessary reaction time depends essentially on the temperature; it is comprised between 0.5 and 4 hours for the above-mentioned optimum temperature range.

The preferred way of carrying out the process according to the invention consists in adding methanol and water to the methacrylamide sulphuric solution from the beginning of the reaction, but it is within the scope of the invention to add the reagents separably. It is possible, for instance, to add methanol after partial or total amide hydrolysis by water, or add methanol with the latter.

The process according to the invention is therefore characterized by many economical and technical advantages:

The very low methanol contents in the organic phase enable one to obtain pure methyl methacrylate by direct distillation of the latter, whereas the known processes involve expensive additional plants for separating methanol by washing of the organic phase with water or a saline solution, followed by the recovery of the methanol to be recycled by distillation of the diluted waters resulting from said washing.

The methacrylic acid separated in this very distillation in the present process is recycled to the esterification step or drawn off in variable quantities to be commercialized.

This methacrylic acid recycling is technically much more simple and economical than the methanol excess recycling used in the known processes. It does not entail, in fact, any additional recovery installation since methacrylic acid is drawn off at the bottom of the distilling column used for the direct distilling of the raw reaction product.

The idea of reduced quantities of methanol enables one to limit losses in the form of methyl oxide which, being proportional to the methanol used, are therefore, not large.

The reaction taking place entirely in liquid phase, the adjustment of reagent concentrations, temperature and reaction time, is easy and well defined. It is possible, in particular, to have factors such as reagents ratio and temperature varied independently.

Polymerization risks, constituting a serious problem in the known methods, are very slight.

The process offers the possibility of producing simultaneously methyl methacrylate and methacrylic acid.

It is especially easy to operate continuously since all the reagents move in the same direction.

The transformation of methacrylamide into methacrylic products is nearly quantitative.

Finally, the aqueous phase containing sulphuric acid and ammonium sulphate, contains only a very small quantity of organic materials and is far less colored than the aqueous phases obtained with the prior processes. It may be used, therefore, without any other treatment for the production of ammonium sulphate for instance.

The following non-limiting examples illustrate the process:

Example 1

3 moles of methanol (96 g.) and 9.5 moles of water (171 g.) were added to 936 g. of a methacrylamide sulphuric solution containing 3.6 moles of methacrylamide resulting from 3.8 moles of acetone cyanhydrine.

The mixture was maintained under stirring at 90 to 95° C. for 18 hours under atmospheric pressure.

The organic phase, separated by decantation at the end of the operation, weighed 340 g. and contained 204 g. methyl methacrylate and 120 g. methacrylic acid.

The molar yield in methyl methacrylate and methacrylic acid with respect to the initial acetone cyanhydrine was 90.5% of the theoretical yield.

Example 2

3.7 moles of methanol (118.5 g.) and 12 moles of water (211 g.) were added to 936 g. of a methacrylamide sulphuric solution containing 3.6 moles of methacrylamide.

The mixture was maintained under stirring for 3½ hours at 115 to 120° C. under a 2 kg. absolute pressure.

The organic phase collected by decantation at the end of the operation weighed 370 g. and contained 255 g. methyl methacrylate plus 80 g. methacrylic acid.

The molar yield of methacrylic acid and methyl methacrylate amounted to 96.5% of the theoretical yield with respect to the amide, and also to 91.5% with respect to the initial acetone cyanhydrine.

Pure methyl methacrylate was obtained by fractional distillation of the organic phase.

Example 3

This example illustrates the methacrylamide esterification by methanol in the presence of recycling methacrylic acid.

A mixture composed of:

695 g. of a methacrylamide sulphuric acid solution containing 2.67 moles of the amide,
118.5 g. methanol (3.7 moles),
80 g. methacrylic acid (0.93 mole) resulting from an earlier working, and
153 g. water (8.5 moles), was heated under stirring for 3½ hours, at 115 to 120° C. under a 2 kg. absolute pressure.

The organic phase decanted at the end of the operation weighed 370 g. and contained 256 g. methyl methacrylate plus 80 g. methacrylic acid.

The transformation ratio of the initial acetone cyanhydrine into methyl methacrylate was 91.5%.

The quantity of formed polymer was slight.

Pure methyl methacrylate was obtained by fractional distillation of the raw material.

After purification, methacrylic acid constituting the distillation residue of the organic phase, analyzed 99%; its melting point was 15.4° C.

Example 4

This example illustrates the practice of the process according to the invention in a continuous way with recycling of methacrylic acid.

Methacrylamide was prepared continuously from sulphuric acid and acetone cyanhydrine.

The reagents flow was as follows:

|  | Kg./h. |
|---|---|
| Acetone cyanhydrine | 20 |
| Sulphuric acid 100% | 34.6 |

The esterification of the methacrylamide produced by the water-methanol mixture was carried out in a sequence of 4 autoclaves in which the reaction mixture was stirred under a 2 kg. absolute pressure.

Every autoclave temperature was fixed at 117° C. The total time of stay of the reagents in the autoclaves was 4 hours.

At the end of the reaction both phases of the obtained reaction mixture were decanted continuously and the separated organic phase was fractionated by distillation.

The methacrylic acid phase and the light distillation fractions containing a slight fraction of methanol are recycled continuously to the first autoclave of esterification.

The esterification reagent flow was as follows:

|  | Kg./h. |
|---|---|
| Methacrylamide sulphuric solution | 54.6 |
| Methanol | 9.6 |
| Recycled methacrylic acid | 6.5 |
| Water | 12.7 |

2,150 kg. of pure methyl methacrylate were produced in the course of the operation which lasted 100 hours.

The molar yield of pure methyl methacrylate with respect to the introduced acetone cyanhydrine was 91.5% of the theoretical yield.

The invention is not limited to the preferred embodiment but may be otherwise embodied or practiced within the scope of the following claims.

We claim:

1. A process of making methyl methacrylate by esterification in the liquid phase of a methacrylamide sulphuric solution obtained from acetone cyanhydrine and sulphuric acid, which comprises adding water and methanol to said methacrylamide sulphuric solution, the water added amounting to 1 to 6 moles per mole of acetone cyanhydrine, and reacting the resulting mixture under superatmospheric pressure and entirely in the liquid phase at a temperature between 90 and 150° C. to produce methyl methacrylate and methacrylic acid, decanting the organic phase and separating directly, by fractional distillation, the pure methyl methacrylate contained in it from the attending methacrylic acid.

2. A process according to claim 1, wherein the amount of methanol added to said methacrylamide sulphuric solution is between 0.7 and 1.5 moles per mole of acetone cyanhydrine.

References Cited in the file of this patent

UNITED STATES PATENTS 2,265,785    Wainright et al. _____ Dec. 9, 1941